US009186577B2

(12) United States Patent
Weitzner et al.

(10) Patent No.: US 9,186,577 B2
(45) Date of Patent: Nov. 17, 2015

(54) COLLAPSIBLE ENCLOSURE FOR PLAYING GAMES ON COMPUTERS AND GAMING CONSOLES

(75) Inventors: Daniel Weitzner, Concord (CA); Peter Muellerchen, Concord (CA); Chris Scott, Concord (CA)

(73) Assignee: Visual Sports Systems, Concord, ON (CA)

( * ) Notice: Subject to any disclaimer, the term of this patent is extended or adjusted under 35 U.S.C. 154(b) by 0 days.

(21) Appl. No.: 13/577,075

(22) PCT Filed: Feb. 3, 2011

(86) PCT No.: PCT/CA2011/000119
§ 371 (c)(1),
(2), (4) Date: Sep. 10, 2012

(87) PCT Pub. No.: WO2011/094846
PCT Pub. Date: Aug. 11, 2011

(65) Prior Publication Data
US 2012/0329580 A1 Dec. 27, 2012

Related U.S. Application Data

(60) Provisional application No. 61/300,906, filed on Feb. 3, 2010.

(51) Int. Cl.
*A63B 71/00* (2006.01)
*A63F 13/20* (2014.01)
*A63F 13/90* (2014.01)
(52) U.S. Cl.
CPC ............ *A63F 13/06* (2013.01); *A63F 13/08* (2013.01); *A63F 2300/1093* (2013.01); *A63F 2300/301* (2013.01)

(58) Field of Classification Search
CPC ...... A63F 13/00; A63F 13/04; A63F 2300/66; A63F 3300/6684
USPC ........................................... 273/148 R
See application file for complete search history.

(56) References Cited

U.S. PATENT DOCUMENTS

| | | | | |
|---|---|---|---|---|
| 3,324,928 A | * | 6/1967 | Muller | 160/24 |
| 4,278,095 A | * | 7/1981 | Lapeyre | 600/502 |
| 4,317,553 A | * | 3/1982 | Meinunger | 248/171 |
| 4,521,097 A | * | 6/1985 | Kuehnle et al. | 399/143 |
| 4,695,593 A | * | 9/1987 | Kuwabara et al. | 521/60 |
| 4,817,950 A | * | 4/1989 | Goo | 463/36 |
| 4,951,946 A | * | 8/1990 | DeYoung | 473/474 |
| 5,402,738 A | * | 4/1995 | Carr et al. | 108/157.1 |
| 5,674,932 A | * | 10/1997 | Agostini et al. | 524/430 |
| 5,846,139 A | * | 12/1998 | Bair et al. | 473/156 |

(Continued)

*Primary Examiner* — Michael Dennis
*Assistant Examiner* — Dolores Collins

(57) ABSTRACT

The present invention is directed to a portable, collapsible enclosure for use with a portable game console or computer for playing video games on a large screen television where the game involves tracking the position and movement of a moving object. The enclosure has a fabric cover and a frame which is movable between a collapsed position whereby the enclosure may be easily stored and an expanded position for playing a game. The fabric cover of the enclosure in the expanded position has an open front, side and top walls and a rear wall. The rear wall is provided as a netting material which is selected to arrest the movement of a moving object projected into the enclosure through the open front, while permitting a user to observe an image displayed on a large screen television placed to the rear or side of the enclosure.

14 Claims, 5 Drawing Sheets

(56) References Cited

U.S. PATENT DOCUMENTS

| | | | |
|---|---|---|---|
| 6,223,482 B1 * | 5/2001 | Zohar | 52/109 |
| 6,981,350 B1 * | 1/2006 | Redmon | 52/646 |
| 7,038,855 B2 * | 5/2006 | French et al. | 359/630 |
| 7,107,733 B1 * | 9/2006 | Rueckert | 52/646 |
| 7,191,555 B2 * | 3/2007 | Hughes | 40/603 |
| D548,765 S * | 8/2007 | Kotera et al. | D16/241 |
| 7,341,530 B2 * | 3/2008 | Cavallaro et al. | 473/455 |
| 7,571,737 B2 * | 8/2009 | Jang | 135/146 |
| 7,710,646 B2 * | 5/2010 | Stewart et al. | 359/450 |
| 7,850,526 B2 * | 12/2010 | Zalewski et al. | 463/36 |
| D630,266 S * | 1/2011 | Frank et al. | D21/506 |
| 7,918,733 B2 * | 4/2011 | Zalewski et al. | 463/39 |
| 8,045,264 B2 * | 10/2011 | Elliott et al. | 359/443 |
| 8,085,339 B2 * | 12/2011 | Marks | 348/362 |
| 8,123,311 B2 * | 2/2012 | Nilsson | 312/108 |
| 8,142,288 B2 * | 3/2012 | Zalewski | 463/39 |
| 8,159,745 B2 * | 4/2012 | Abe et al. | 359/461 |
| 8,188,968 B2 * | 5/2012 | Marks | 345/156 |
| 8,342,963 B2 * | 1/2013 | Steiner et al. | 463/36 |
| 8,368,753 B2 * | 2/2013 | Zalewski | 348/142 |
| 8,371,087 B2 * | 2/2013 | Benshetrit | 52/646 |
| 8,418,860 B2 * | 4/2013 | Rimmer et al. | 211/85.7 |
| D684,209 S * | 6/2013 | Measom et al. | D16/241 |
| D685,837 S * | 7/2013 | Measom et al. | D16/241 |
| 2007/0049374 A1 * | 3/2007 | Ikeda et al. | 463/30 |
| 2009/0061871 A1 * | 3/2009 | Gross et al. | 455/436 |

* cited by examiner

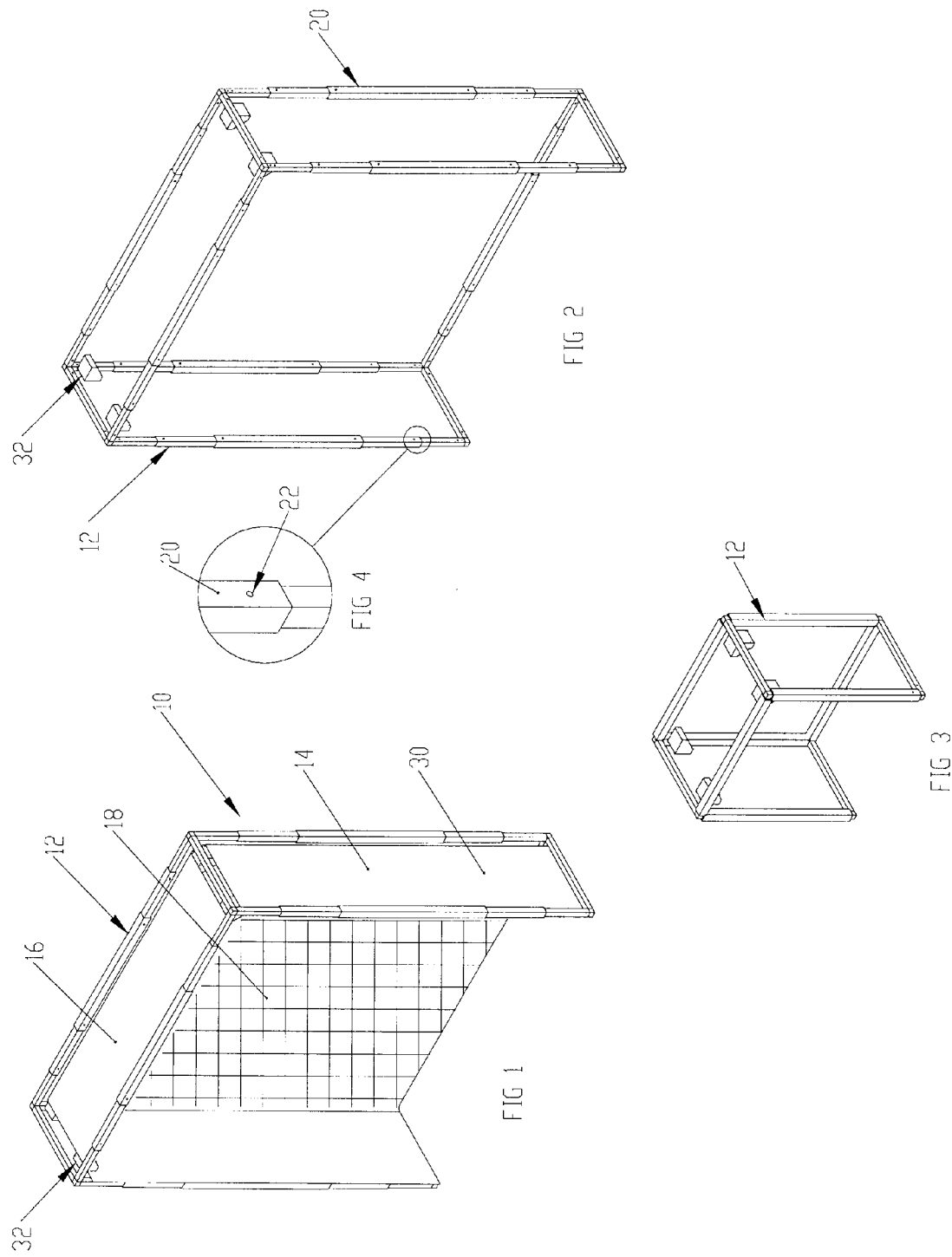

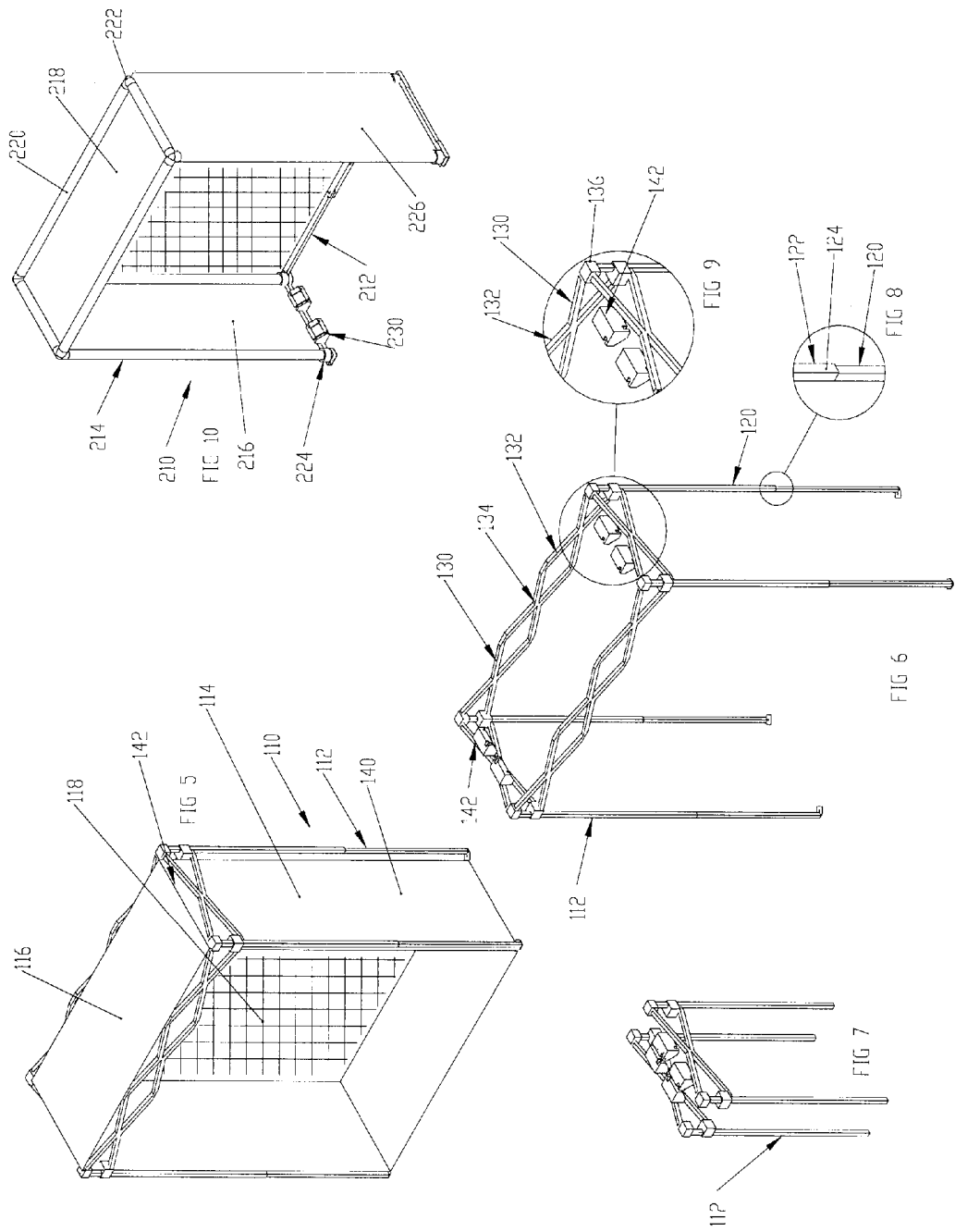

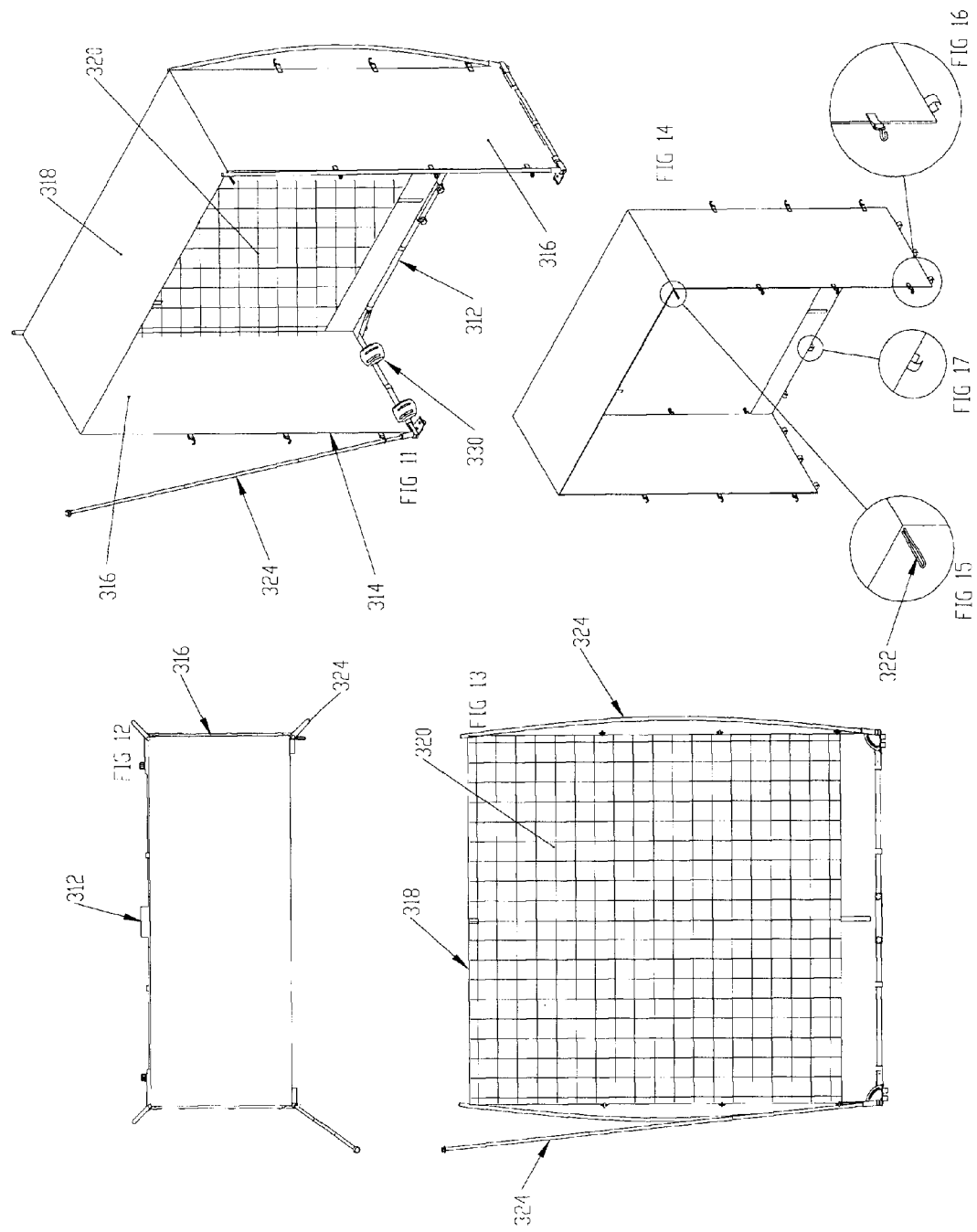

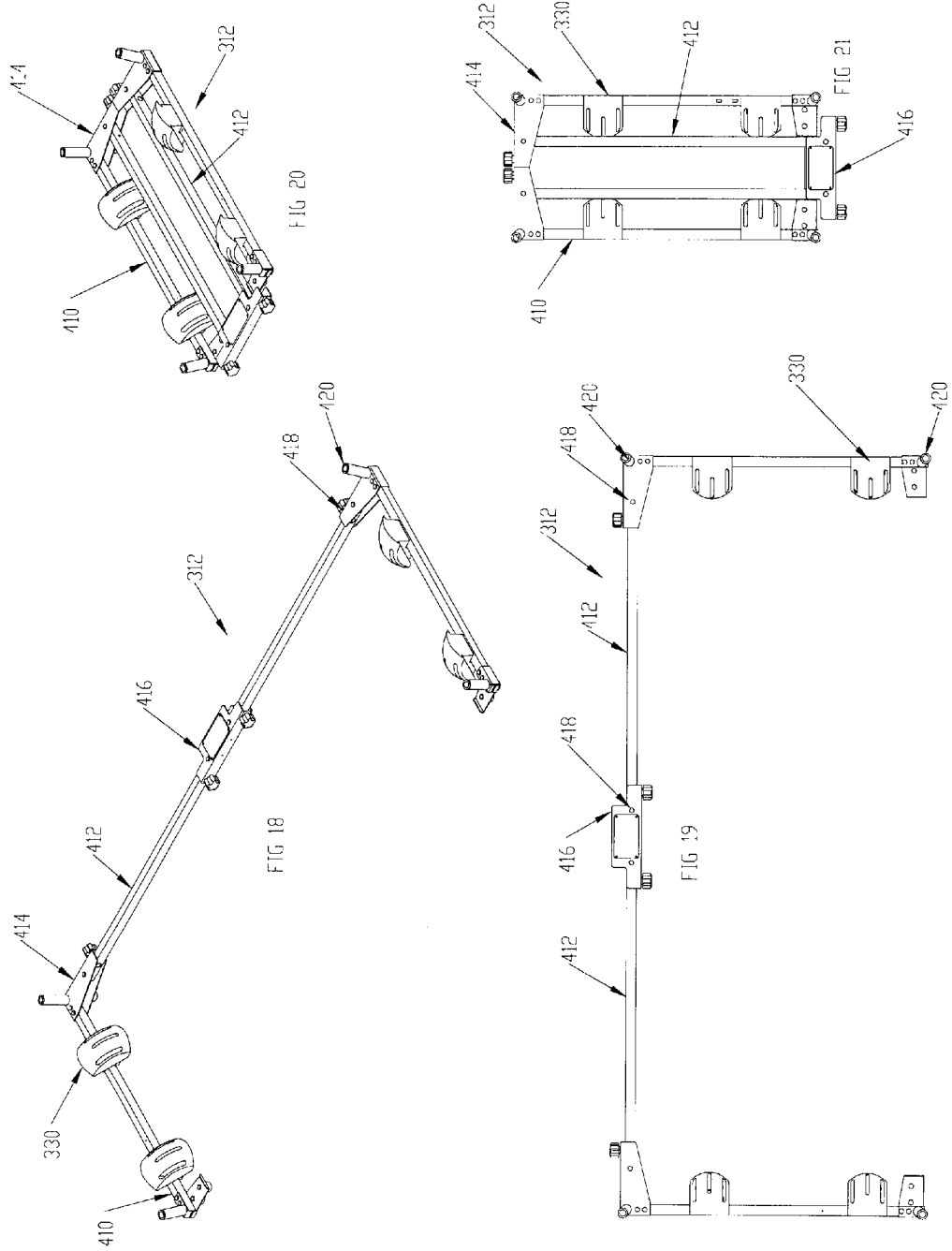

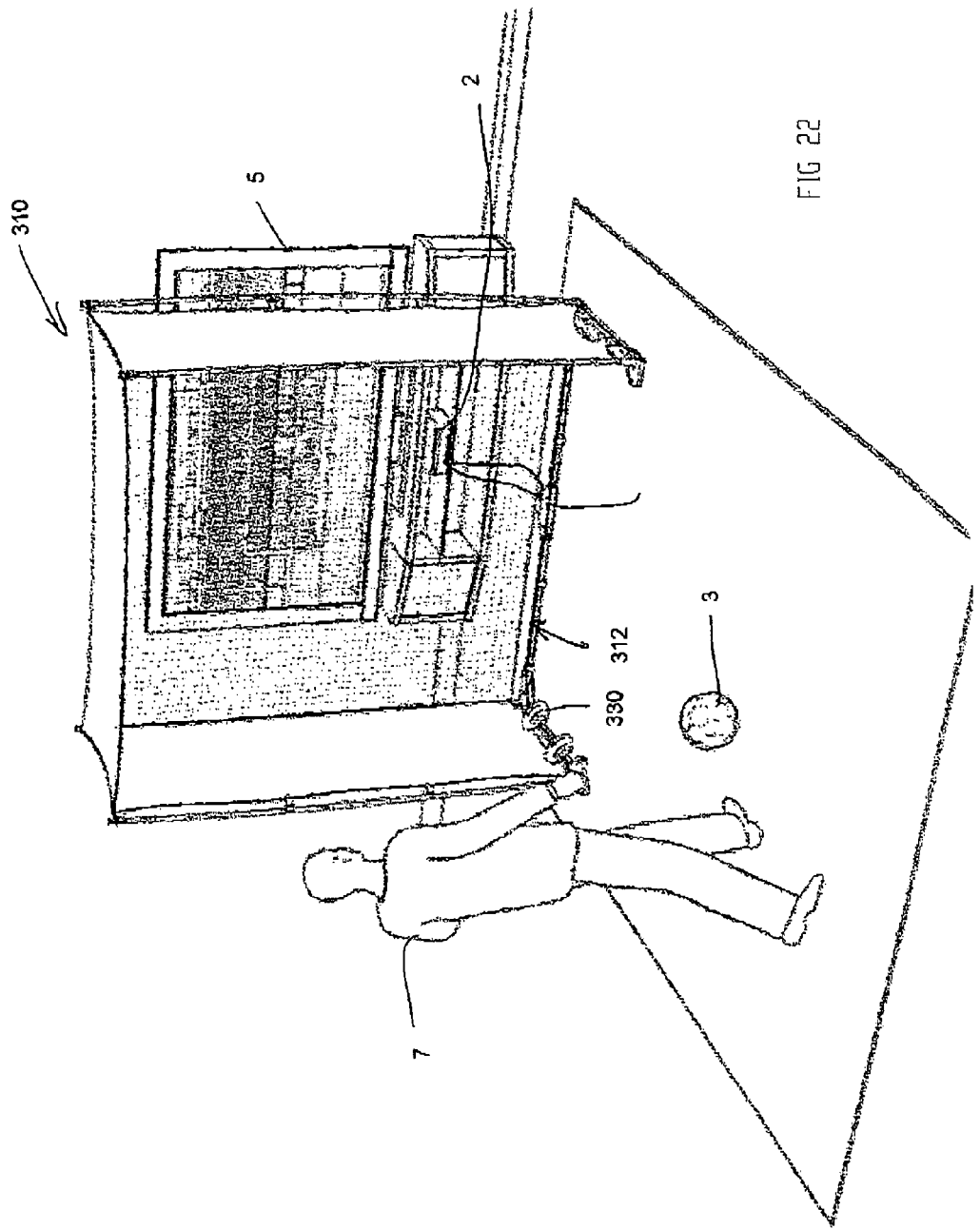

COLLAPSIBLE ENCLOSURE FOR PLAYING GAMES ON COMPUTERS AND GAMING CONSOLES

FIELD OF THE INVENTION

The present invention is directed to a portable and collapsible enclosure for use with computers and game consoles. In particular, the present invention is directed to a portable enclosure for use with an object tracking interface device for a computer or game console, which tracks the movement of a moving object within the field of view of the object tracking interface device and which provides input to the computer or game console on the movement of the moving object.

BACKGROUND OF THE INVENTION

Video games for playing on a personal computer or game console have become quite popular. A very popular type of video game is a sports simulation game simulating a sport such as golf, hockey, football, baseball, etc. These games are generally played by the user using a user interface device to interact with the video game console or computer. The output of the game console or computer is generally sent to a display device such as a monitor, television or projector which displays the image on a screen. The larger the output image of the game console or computer, the better the gaming experience is for the player.

A number of user interface devices have been developed to allow a user to interact with video games and computers. Examples of such user interface devices include a simulated surfboard shown in U.S. Pat. No. 4,817,950, a method of playing racket and other types of games as described in U.S. Pat. No. 4,695,953 and a treadmill-type arrangement as described in U.S. Pat. No. 4,278,095. In addition, Published U.S. Patent Application No. 20070049374 by Nintendo describes a game system which utilizes a game controller having a motion detection capability. These other user interface devices have been developed to provide for a more realistic gaming experience when a user is playing games and in particular, sports simulation games. However, these user interface devices do not completely mimic the experiences the user would encounter if playing the real game particularly in a three dimensional spatial relationship.

The use of object tracking devices such as video cameras for tracking moving objects such as golf balls, baseballs, etc is also known. Examples of such systems are shown in U.S. Pat. Nos. 5,342,051; 5,768,151; 5,938,545, among others. In our earlier patent application, U.S. Ser. No. 11/848,956, filed Aug. 31, 2007, the disclosure of which is incorporated herein by reference, we describe an object tracking interface device for use with computers and game consoles where the device tracks the movement of a moving object within the field of view of the interface device and provides input to the computer or game console on the movement of the moving object. Similar to many such devices, the tracking devices may be provided as part of a frame enclosure which includes a screen at the rear of the frame onto which is projected the image for playing the game. The screen is constructed of a shock absorbing material suitable both for displaying the image as well as for stopping the moving object used in playing the game without being damaged.

While such a frame enclosure with an attached screen is common in many such apparatus, such an arrangement is not entirely suitable for home use. In order to provide the necessary support for the screen, the enclosure is generally a permanent installation. Most people do not have the space required for such a permanent installation. In addition, many such enclosures are relatively large and will not be easily accommodated in a residential space.

In the past, the largest images were available using projectors and screens. With the recent advances in digital televisions such as LCD, LED and plasma, large screen televisions are now becoming commonplace. These large screen televisions provide for an enhanced playing experience for the user. However, they do not provide as full an experience for games which utilize a moving object such as sports games as do the enclosure with attached screen.

There thus remains a need for an apparatus which will allow for a more realistic gaming experience with large screen televisions.

SUMMARY OP THE INVENTION

The present invention is directed to a portable, collapsible enclosure for playing video games on a large screen television where the game involves tracking the position and movement of a moving object. The enclosure comprises a fabric cover and a frame which is movable between a collapsed position whereby the enclosure may be easily stored and an expanded position for playing a game. The fabric cover of the enclosure in the expanded position has an open front, side and top walls and a rear wall. The rear wall is provided as a netting material which is selected to arrest the movement of a moving object projected into the enclosure through the open front, while permitting a user to observe an image displayed on a large screen television placed to the rear or side of the enclosure.

In an aspect of the invention, the frame includes a collapsible base to which are attached collapsible poles to support the enclosure.

In another aspect of the invention, the collapsible base comprises side members attached to a rear member by releasable locking pivots which have releasable locking means to releasably lock the side members and the rear member when the collapsible base is in the expanded configuration.

In a further aspect of the invention, the releasable locking pivots comprise a plate attached to the adjacent ends of each of the side members and rear member by a suitable fastening means, the plates being provided with releasable locking means.

In another aspect of the invention, the releasable locking means comprise a pin or bolt which cooperates with a hole in both the plate and the side or rear member to be releasably inserted in aligned holes of the plate and side or rear member to releasably lock the locking pivot plate to each of the side and rear members in the expanded configuration, the pin or bolt being releasable to allow the collapsible base to be placed in the collapsed configuration.

In yet another aspect of the invention, an object tracking device is attached to each of the side members of the collapsible base.

In a further aspect of the invention, the collapsible poles comprise a plurality of individual sections releasably connectable to one another, preferably metal or fiberglass shock corded rods or poles which are of a length greater than the height of the enclosure.

In another aspect of the invention, the corners of the base are provided with a means for engaging an end of the collapsible pole, preferably, a hollow tube extending upwardly from the corner of the base into which the end of the collapsible pole may be placed.

In yet another aspect of the invention, a first end of the collapsible pole is provided with a means to engage the corner of the collapsible base and a second end of the collapsible pole is provided with a hook means to engage and hold loops provided at upper corners of the fabric cover, whereby when the pole ends are hooked into the loops, the pole is bowed outwardly under tension to maintain the enclosure in the expanded configuration.

In a further aspect of the invention, the fabric cover is provided with a plurality of loops along the edges of the side walls to engage the poles when the enclosure is in the expanded position, the loops being elasticized to accommodate the bowing of the pole.

In another aspect of the invention there is provided a game system for playing video games on a large screen television where the game involves tracking the position and movement of a moving object. The game system comprises a game console or personal computer having a one or more user input devices, a memory in which the program for running a game is loaded, and an output connected to a large screen television for displaying the game. The system also includes a portable, collapsible enclosure having a fabric cover and a frame which is movable between a collapsed position whereby the enclosure may be easily stored and an expanded position for playing the game, the fabric cover of the enclosure in the expanded position having an open front, side and top walls and a rear wall, the rear wall being a netting material which is selected to arrest the movement of the moving object projected into the enclosure through the open front, while permitting a user to observe an image displayed on a large screen television placed to the rear or side of the enclosure. The frame includes a collapsible base to which are attached collapsible poles to support the enclosure, the collapsible base comprising side members attached to a rear member by releasable locking pivots which have releasable locking means to releasably lock the side members and the rear member when the collapsible base is in the expanded configuration. One of the user input devices of the game console or computer is an object tracking device connected to the game console or personal computer and attached to each of the side members of the collapsible base to track the movement of the moving object through the enclosure and pass the position and velocity vector of the moving object to the game console or personal computer.

BRIEF DESCRIPTION OF THE DRAWINGS

Preferred embodiments of the present invention are illustrated in the attached drawings in which:

FIG. 1 is a perspective view of a first preferred embodiment of a collapsible enclosure of the present invention in use with a game console or computer;

FIG. 2 is a perspective embodiment of the frame of the collapsible enclosure of FIG. 1 in the expanded position;

FIG. 3 is a perspective view of the frame of the collapsible enclosure of FIG. 1 in the collapsed position;

FIG. 4 is a detail of the means for expanding and collapsing the frame of the collapsible enclosure of FIG. 1;

FIG. 5 is a perspective view of a second preferred embodiment of a collapsible enclosure of the present invention;

FIG. 6 is a perspective embodiment of the frame of the collapsible enclosure of FIG. 5 in the expanded position;

FIG. 7 is a perspective view of the frame of the collapsible enclosure of FIG. 5 in the collapsed position;

FIG. 8 is a detail of part of the means for expanding and collapsing the frame of the collapsible enclosure of FIG. 5;

FIG. 9 is a perspective view of the mounting of the tracking cameras to the frame;

FIG. 10 is a perspective view of a third preferred embodiment of a collapsible enclosure of the present invention;

FIG. 11 is a perspective view of a fourth preferred embodiment of a collapsible enclosure of the present invention;

FIG. 12 is a top plan view of the collapsible enclosure of FIG. 11 in the expanded position;

FIG. 13 is a front plan view of the collapsible enclosure of FIG. 11 in the expanded position;

FIG. 14 is a perspective view of the fabric cover of the collapsible enclosure of FIG. 11 in the expanded position;

FIG. 15 is a detail of the loop arrangement at the top of the collapsible enclosure of FIG. 11;

FIG. 16 is a detail of the loop arrangement at the bottom of the collapsible enclosure of FIG. 11;

FIG. 17 is a detail of the loop arrangement at the back of the collapsible enclosure of FIG. 11;

FIG. 18 is a perspective view of the base in the expanded position for use with the third and fourth embodiments;

FIG. 19 is a top plan view of the base of FIG. 18 in the expanded position;

FIG. 20 is a perspective view of the base of FIG. 18 in the collapsed position; and FIG. 21 is a top plan view of the base of FIG. 18 in the collapsed position; and FIG. 22 is a perspective view of the collapsible enclosure for a game system in use.

DETAILED DESCRIPTION OF THE PREFERRED EMBODIMENTS

A first preferred embodiment of the collapsible enclosure for a game system such as a computer or game console, is illustrated in FIGS. 1 to 4 generally indicated by the numeral 10. The collapsible enclosure of the present invention is for use with a game console or computer for playing a game utilizing a moving object. The game console or computer is provided with input devices such as a game pad 4 as well as an object tracking input device associated with the collapsible enclosure as will be described herein below. A large screen television is provided at the rear of the collapsible enclosure to allow the user to play the game displayed on the television as will be described further below.

The collapsible enclosure 10 has a fabric cover 30 and a frame 12 which is movable between an expanded position for use with the game system and a collapsed position for storage. The fabric cover 30 of the enclosure 10 has an open front, and the sidewalls 14 and top wall 16 are covered by a fabric material. The rear wall 18 is netting or mesh fabric which is selected to arrest the movement of a moving object projected into the enclosure through the open front. The sizing of the spaces or openings in the netting or mesh fabric covering the rear wall 18 is selected to ensure that any moving object does not pass through an opening of the netting or mesh fabric. For games utilizing a relatively large ball such as a soccer ball, the openings could be relatively large; however for games utilizing relatively smaller balls such as baseball or golf, the openings would be smaller. Preferably, to allow for the widest possible use, the fabric covering the rear wall is a fine mesh material having openings small enough to allow it to be used with a golf ball.

As illustrated in FIGS. 1 to 4, the frame 12 is movable between an expanded position as shown in FIGS. 1 and 2 and a collapsed position as shown in FIG. 3. The first embodiment of the frame 12 utilizes nested tubes 20 with spring button connectors 22 as shown in detail in FIG. 4. Each of the frame members is comprised of a plurality of tubes 20 which nest one within the other. The individual tubes 20 are provided with holes passing through the wall of the tube adjacent a first end. The interior tubes at their second end are provided with spring button connectors having an outwardly projecting button on one end of a piece of spring steel, the other end of the piece of spring steel being attached to the end of the tube. As the frame 12 is being expanded, the button rides along the interior wall of the adjacent tube until it is biased into the locking position within the hole of the adjacent tube. To collapse the frame, the buttons are biased inwardly until they clear the hole and the frame can be collapsed by sliding the tubes one within the other.

The fabric cover 30 may be provided in individual panels or as one piece which is attached to the expanded frame prior to use through fastening means such as loops. Preferably, the fastening means are releasable such as hook and loop fasteners. Preferably, the fabric cover 30 is provided in one piece of the individual panels sewn together and the fabric cover is permanently attached to the frame so that the fabric cover will not be inadvertently released from the frame when the apparatus is in use. When the enclosure 10 is collapsed, the fabric panels fold to allow for storage of the enclosure 10.

The enclosure 10 of the present invention is preferably provided with permanently mounted object tracking interface devices such as those described in U.S. patent application Ser. No. 11/848,956, filed Aug. 31, 2007, the disclosure of which is incorporated herein by reference. In the embodiment illustrated in FIGS. 1 to 4, the object tracking interface device utilizes digital video cameras 32 as shown in FIG. 2. The video cameras 32 are mounted adjacent the corners of the frame, either at the bottom or the top corners of the frame. A plurality of video cameras 32 capture the flight of the moving object, such as a ball, within the field of view of the video cameras 32. The video cameras 32 are mounted at the top corner of the frame 12 preferably pointing inwardly and downwardly, such that the field of view of each individual camera 32 covers the space in front of the rear wall. More preferably, the video cameras 32 are mounted to view into the enclosure 10 at a 45° angle. Preferably, in order to enable the video cameras 32 to more accurately track the path and velocity of the moving object such as a ball, more than one video camera 32 is attached at each side of the frame 12, the individual video cameras 32 being spaced apart a distance to enable the timing of the path of the ball to be properly tracked and calculated.

A second embodiment of a collapsible enclosure of the present invention is illustrated in FIGS. 5 to 9 generally indicated by the numeral 110. Similar to the first embodiment, the collapsible enclosure 110 has a frame 112 which is movable between an expanded position and a collapsed position. The enclosure 110 has a fabric cover with an open front, and sidewalls 114 and top wall 116 covered by a fabric material. The rear wall 118 is covered with a netting or mesh fabric.

As illustrated in FIGS. 5 to 9, the frame 112 is movable between the expanded position shown in FIGS. 5 and 6 and the collapsed position shown in FIG. 7. This embodiment of the enclosure has four legs 120 constructed of nesting tubes 122 with spring button connectors 124 similar to the first embodiment. The top of the frame 112 has a pivoting scissors arrangement 130 along the front and back to allow the enclosure 110 to move between the collapsed and expanded positions. The scissors arrangement 130 is comprised of a two groups of a plurality of bar material 132 connected end to end by pivoting connectors 134 to allow the individual bars 132 to move between an expanded position and a collapsed side by side position. The two groups of the plurality of bar materials 132 are joined to one another by connecting the adjacent bars to each other at their midpoint in a crisscross arrangement. In the expanded position, the sections of the scissors arrangements are elongated while in the collapsed position, they lie side by side. The two groups of the plurality of bar materials are connected at their ends to the legs 120 by a pivoting arrangement 136 that allows them to collapse and move inwardly into the frame when the enclosure is moved to the collapsed position.

Similar to the first embodiment, the fabric cover 140 is provided as one piece of individual panels sewn together and permanently attached to the frame 112 so that the fabric cover 140 will not be inadvertently released from the frame when the apparatus is in use. When the apparatus is collapsed, the fabric panels fold to allow for storage of the apparatus. In addition, the enclosure is provided with the plurality of video cameras 142 as an object tracking interface device at a corner of the frame as described in U.S. patent application Ser. No. 11/848,956.

A third embodiment of a collapsible enclosure of the present invention is shown in FIG. 10 generally indicated by the numeral 210. This embodiment of the enclosure utilizes a folding steel base frame 212 which will be described in detail herein below and an inflatable upper structure 214. The edges of the side walls 216 and top wall 218 of the enclosure 210 are formed of inflatable hose 220 connected together by suitable corner angles 222. The inflatable hose 220 is generally a reinforced hose which is inflated by a suitable pump through an inflation valve 224 to place the enclosure in the expanded position. When the air pressure is released, the inflatable hose collapses and the enclosure is moved to the collapsed position.

Similar to the other embodiments, the fabric cover 226 is provided as one piece of individual panels sewn together and permanently attached to the steel base frame 212 and inflatable hose 220 so that the fabric cover 226 will not be inadvertently released from the frame when the apparatus is in use. When the collapsible closure is collapsed, the fabric panels fold to allow for storage of the collapsible enclosure. In addition, the collapsible enclosure is provided with the plurality of video cameras 230 as an object tracking interface device as described in U.S. patent application Ser. No. 11/848,956 at the bottom sides of the folding steel base frame 212 as will be described below.

A fourth embodiment of a collapsible enclosure according to the present invention is illustrated in FIGS. 11 to 17 generally indicated by the numeral 310. Similar to the third embodiment, this embodiment of the collapsible enclosure 310 utilizes a folding steel base 312 to which is attached the fabric cover 314 of one piece of the individual side panels 316 top panel 318 and rear panel 320 sewn together. The exterior corners of the fabric cover 314 are provided with loops 322 to accept one end of rods or poles 324 which form the structure of the frame. The rods or poles 324 are preferably metal or fiberglass shock corded rods or poles which are of a length greater than the height of the enclosure 310. The one end of the rods or poles 324 are provided with a hook means to engage and hold the loops 322 provided at the corners of the fabric cover 314. The other end of the rods or poles 324 are provided with a means to engage the corners of the base frame 312 as will be described below. When the rod or pole ends are hooked into the loops 322, the rod or pole 324 is bowed outwardly under tension to maintain the enclosure 310 in the expanded configuration.

To move the enclosure 310 to the collapsed position, the ends of the rods or poles 324 are disengaged from the loops 322 at the corners of the fabric cover 314 and from the corners of the base frame 312. The fabric cover 314 then collapses and the steel base frame 312 is folded as described below. To move the enclosure 310 to the expanded position, the process is reversed. The steel base frame 312 is first expanded and the fabric cover 314 spread out. The rods or poles 324 are then installed by engaging the lower end at the lower corner of the base frame 312 followed by engaging the loops 322 at the upper corners of the fabric cover by the upper ends of the rod or pole. This is repeated for each of the four rods or poles until the enclosure is expanded.

Similar to the third embodiment, the collapsible enclosure 310 is provided with the plurality of video cameras 330 as an object tracking interface device as described in U.S. patent application Ser. No. 11/848,956 at the bottom sides of the folding steel base frame as will be described below.

FIGS. 18 to 21 illustrate the folding steel base frame 212 or 312 for use with the third and fourth embodiments of the collapsible enclosure of the present invention. The base frame 212 or 312 has side members 410 to which are attached the video cameras 230 or 330 as an object tracking interface device as described in U.S. patent application Ser. No. 11/848,956. The side members 410 are attached to a rear member 412 by releasable locking pivots 414 which have releasable locking means to releasably lock the side members 410 to the rear member 412 when the steel base frame 212 or 312 is in the expanded configuration. Preferably, the releasable locking pivots 414 are a U shaped plate attached to the adjacent ends of each of the side members 410 and rear member 412 by a suitable fastening means such as a pin or bolt 418 arrangement. The plates are provided with a hole which cooperates with a hole in the side and rear member to releasably lock the locking pivot plate 414 to each of the side 410 and rear 412 members by the pin or bolt 418. When the holes of the plate and side or rear members are aligned, the pin or bolt is placed in the aligned holes and tightened to hold the base frame 312 in the expanded position. To collapse the base frame 312, the pin and bolt 418 is released such that the side 410 and rear member 412 can freely pivot to the collapsed position.

An alternative arrangement of the releasable locking means would be the plates to the interior of the member being provided with releasable locking means such as a detent which cooperates with a hole in the side and rear member to releasably lock the locking pivot plate 414 to each of the side 410 and rear 412 members. As pressure is placed on the side 410 or rear member 412, the detent of the plate is caromed out of the hole of the side or rear member to allow the frame to be placed in the collapsed configuration. To place the steel base frame in the expanded configuration, the side and rear members are moved relative to one another to cause the detent of the plate to ride along the surface of the side or rear member until it engages the hole in the side or rear member and locks the frame in the expanded configuration.

As illustrated in FIGS. 18 to 21, in order to provide for a relatively small collapsed configuration for the folding steel base frame 212 or 312, it is preferred that the rear member 412 is provided as two or more individual members connected one to another by a locking pivot plate 416 which operates in a similar manner as the locking pivot plate 414 connecting the side and rear members.

The corner locking plates 414 of the base frame 312 are provided with a means to releasably engage the ends of the poles or rods 324. Preferably, as illustrated in the figures, the means for engaging the collapsible pole 324 comprises a hollow tube 420 extending upwardly from the corner locking plate 414 of the base frame 312 into which the end of the collapsible pole 324 may be placed.

As illustrated in FIG. 22, the collapsible enclosure of the present invention may be set up in front of a large screen television 5 connected to the computer or game console 2 such that the game is viewable on the television 5 through the open mesh rear wall. In this way, the user of the game may propel the moving object for example a sports ball such as a soccer ball, baseball, golf ball, etc. into the enclosure through the open front towards the rear wall and television image of the game. In this way, the game experience is enhanced as it is more realistic in operation. The apparatus is spaced away from the television screen 5 a sufficient distance so that the rear wall may completely arrest the motion of the moving object without risk of the object impacting the television screen. Alternatively, the large screen television 5 may be placed to the side of the enclosure such that it is visible to a user 7 playing a game using the enclosure of the present invention.

The base of the collapsible enclosure may be provided with a playing mat 9 that is adapted to allow for the playing of a selected game. Thus, for playing a game of golf, the playing mat could be a synthetic carpet material imitating a grass mat. The playing mat may be provided with tee locations to allow for teeing of a golf ball. By providing the playing mat as a grass-like mat, the player can hit the golf ball directly off of the mat utilizing an iron and a putter. For playing a game of hockey, the mat would be a low friction plastic material to allow the user to shoot the puck from the playing mat.

To play a game with the apparatus of the present invention, the enclosure 310 is erected from the collapsed position and the object tracking device 312 is connected to the computer or game console 2. The suitable game program is started at the computer or game console 2 and the player 7 inputs the relevant information into the game, such as a player's name and selects the game options as desired. For example, when playing a game of golf, the player will select the course which he wishes to play, as well as other game options such as handicap etc. The game is then started and the game information displays on the television screen 5. To commence play, the player will hit the ball into the collapsible enclosure toward the open mesh rear wall when prompted to do so by the game. The object tracking interface device detects the ball movement and provides the ball flight information as an input to the computer or game console. From the ball flight information provided by the object tracking interface device, the game program calculates the distance and direction of the ball flight and displays the ball flight simulation on the television screen. The player then continues to play the game by striking the ball from the new position, with the desired club and the process is repeated.

In addition to the game of golf, the collapsible enclosure of the present invention may also be used for other games, which include a moving object. For example, in baseball games, rather than using the joystick or mouse for deciding upon the type of pitch to be thrown by a pitcher, the player of the game can actually pitch the ball to the representation of a batter displayed on the television screen. In this way, the operation of game is more realistic and it also allows for immediate feedback for skill development of the player. Similarly, a hockey game could be played utilizing the collapsible enclosure of the present invention where the player would shoot the puck at a goalie, rather than merely utilizing the joystick or other game controller. The use of the collapsible enclosure of the present invention with other game types will be apparent to those of skill in the art.

Although various preferred embodiments of the present invention have been described herein in detail, it will be appreciated by those skilled in the art that variations may be made thereto without departing from the spirit of the invention or scope of the appended claims.

The invention claimed is:

1. A portable, collapsible enclosure for use with a game console or personal computer for playing sport based video games on a large screen television where the sport based video game involves tracking the position and movement of a moving object, the enclosure comprises a fabric cover and a frame which is movable between a collapsed position whereby the enclosure may be easily stored and an expanded position for playing a sport based video game, the fabric cover of the enclosure in the expanded position having an open front, side and top walls and a rear wall, the rear wall being a netting material which is selected to arrest the movement of a moving object propelled into the enclosure through the open front, while permitting a user to observe an image displayed on a large screen television placed to the rear of the enclosure through opening of the netting material, the frame including a collapsible base having a peripheral input device including object tracking devices attached thereto to track the position and movement of the moving object propelled into the enclosure when the enclosure is in the expanded position, the object tracking devices being located on the base to be at the corners of enclosure in the expanded position, the peripheral input device including a means for receiving the output of the object tracking devices for determining the presence of the moving object, a means for calculating the position and velocity vector of the moving object from the output of the object tracking devices and a means for converting the position and velocity vector of the moving object into a human interface device signal which is passed to the computer or game console as a signal from the peripheral input device through a universal serial bus, the peripheral input device allowing for the use with any sports game utilizing simulation games including a moving object.

2. A portable, collapsible enclosure for use with a game console or personal computer according to claim 1 wherein the fabric cover is provided with a plurality of loops along the edges of the side, top and rear walls to engage the frame.

3. A portable, collapsible enclosure for use with a game console or personal computer according to claim 2 wherein the frame includes collapsible poles attached to the collapsible base to support the enclosure.

4. A portable, collapsible enclosure for use with a game console or personal computer according to claim 3 wherein the collapsible base comprises side members attached to a rear member by releasable locking pivots which have releasable locking means to releasably lock the side members and the rear member when the collapsible base is in the expanded configuration.

5. A portable, collapsible enclosure for use with a game console or personal computer according to claim 4 wherein the releasable locking pivots comprise a plate attached to the adjacent ends of each of the side members and rear member by a suitable fastening means, the plates to the interior of the side or rear member being provided with releasable locking means.

6. A portable, collapsible enclosure for use with a game console or personal computer according to claim 5 wherein the releasable locking means comprise a pin or bolt which cooperates with a hole in both the plate and the side or rear member to be releasably inserted in aligned holes of the plate and side or rear member to releasably lock the locking pivot plate to each of the side and rear members in the expanded configuration, the pin or bolt being releasable to allow the collapsible base to be placed in the collapsed configuration.

7. A portable, collapsible enclosure for use with a game console or personal computer according to claim 6 wherein an object tracking device is attached to each of the side members of the collapsible base.

8. A portable, collapsible enclosure for use with a game console or personal computer according to claim 7 wherein the rear member of the collapsible frame comprises two or more individual members connected to one another by pivot plates attached to the adjacent ends of each of the rear members by a suitable fastening means, the plates to the interior of the rear member being provided with releasable locking means.

9. A portable, collapsible enclosure for use with a game console or personal computer according to claim 8 wherein the collapsible poles comprise a plurality of individual sections releasably connectable to one another.

10. A portable, collapsible enclosure for use with a game console or personal computer according to claim 9 wherein the collapsible poles comprise metal or fiberglass shock corded rods or poles which are of a length greater than the height of the enclosure.

11. A portable, collapsible enclosure for use with a game console or personal computer according to claim 10 wherein the corners of the base are provided with a means for engaging an end of the collapsible pole.

12. A portable, collapsible enclosure for use with a game console or personal computer according to claim 11 wherein the means for engaging the collapsible pole comprises a hollow tube extending upwardly from the corner of the base into which the end of the collapsible pole may be placed.

13. A portable, collapsible enclosure for use with a game console or personal computer according to claim 12 wherein a first end of the collapsible pole is provided with a means to engage the corner of the collapsible base and a second end of the collapsible pole is provided with a hook means to engage and hold loops provided at upper corners of the fabric cover, whereby when the pole ends are hooked into the loops, the pole is bowed outwardly under tension to maintain the enclosure in the expanded configuration.

14. A portable, collapsible enclosure for use with a game console or personal computer according to claim 13 wherein the fabric cover is provided with a plurality of loops along the edges of the side walls to engage the poles when the enclosure is in the expanded position, the loops being elasticized to accommodate the bowing of the pole.

* * * * *